March 6, 1945. D. SILVERMAN 2,370,818
WELL MEASUREMENTS
Filed July 30, 1942 4 Sheets-Sheet 1
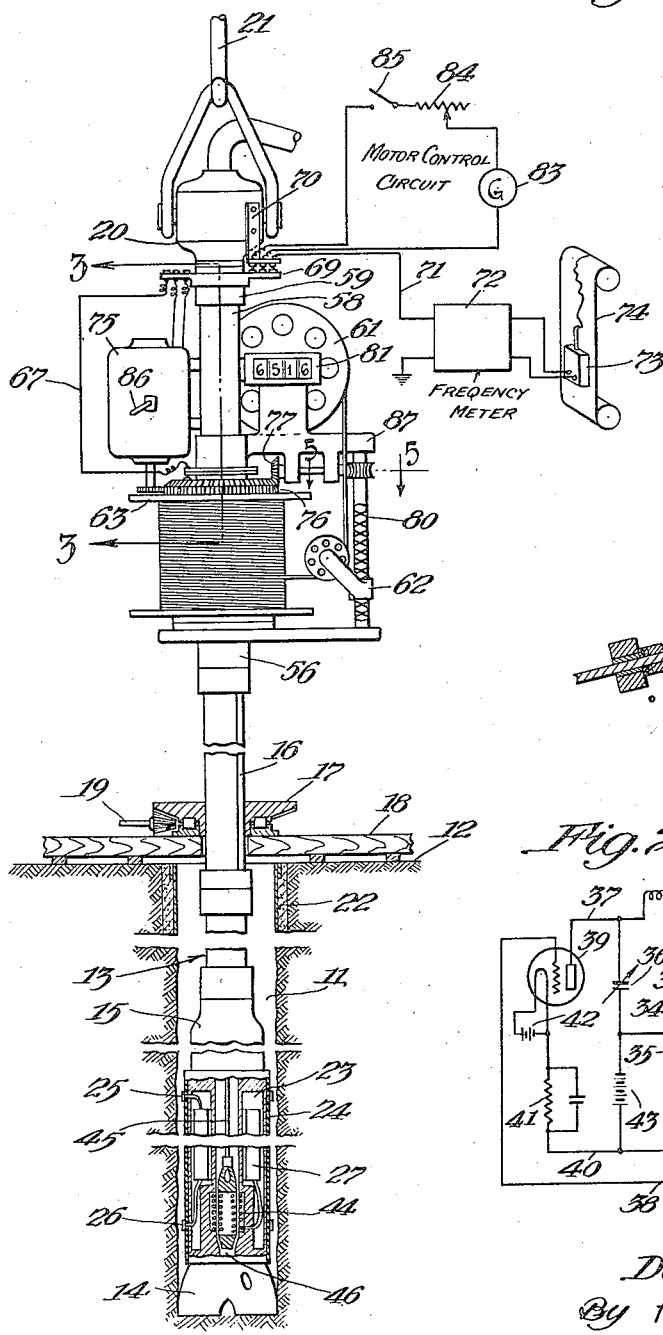
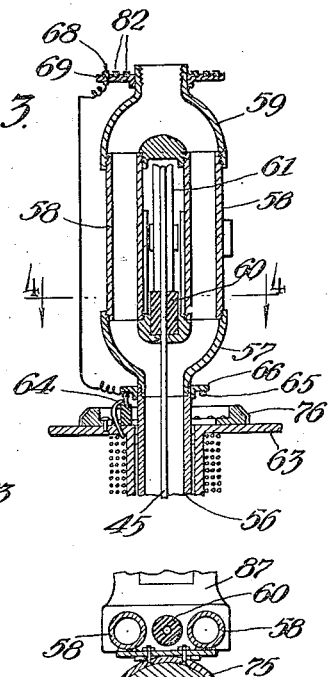
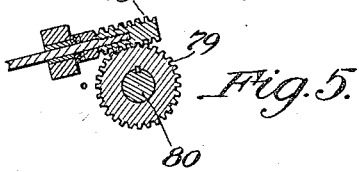
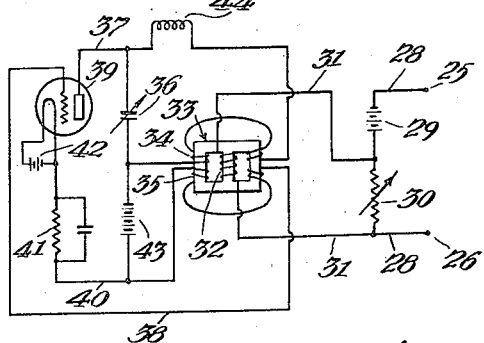
Inventor:
Daniel Silverman.
By Paul F Hawley
Patent Agent.

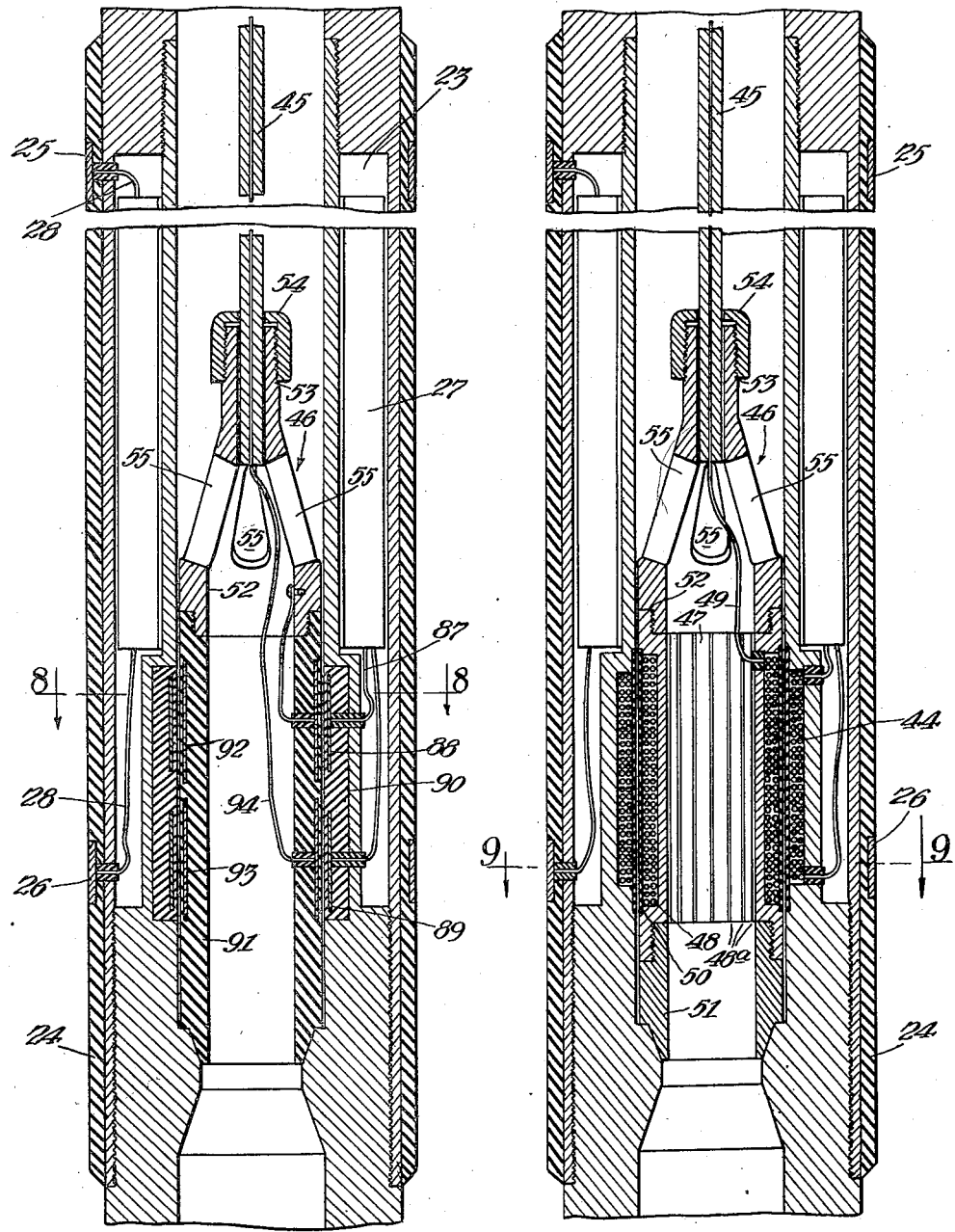

Inventor:
Daniel Silverman
By Paul F Hawley
Patent Agent.

March 6, 1945.   D. SILVERMAN   2,370,818
WELL MEASUREMENTS
Filed July 30, 1942   4 Sheets-Sheet 4

Inventor:
Daniel Silverman,
By Paul F Hawley
Patent Agent.

Patented Mar. 6, 1945

2,370,818

UNITED STATES PATENT OFFICE 2,370,818

WELL MEASUREMENT

Daniel Silverman, Tulsa, Okla., assignor to Stanolind Oil and Gas Company, Tulsa, Okla., a corporation of Delaware Application July 30, 1942, Serial No. 452,881

10 Claims. (Cl. 177—352)

This invention relates to a method and means for determining one or more characteristics of various subsurface geological formations in a well, or of the drilling fluid adjacent such formations and has particular application to the field of electrically logging a well during the process of drilling it.

In making a well log, by which I mean determining as a function of depth in a well one or more characteristics of the formations forming the walls of the well, which information is determined electrically, it has been shown that the presence of the fluid used in drilling a well causes marked change in the observed characteristics as this fluid flows through the permeable formations. Thus, for example, a highly permeable gas sand, the electrical resistivity of which should be extremely high, may pass undetected as the well is logged as an appreciable amount of water from the drilling mud has soaked into this formation decreasing its resistivity to that of the surrounding normally water-soaked formations. It is therefore advisable to log the formations as they are exposed by the drill or as short a time thereafter as possible. In United States patent 2,247,417 one such method and means for logging a well slightly subsequent to the drilling of any particular section was disclosed. The chief application of this type of logging is in situations in which the drilling may be stopped for an appreciable length of time. Other types of systems for logging while drilling or shortly thereafter have been described but none of them have as yet proved to be of much success.

It is an object of this invention to provide a method and means for the logging of wells in which signals are transmitted from the region of logging to the recorder through one continuous electrical cable and in which there is no conductive connection between the cable conductors and the apparatus at the bottom of the well where the signals originate. It is a further object of this invention to provide a system of logging wells during the process of drilling in which variations in the property of the freshly drilled section of a well or of the surrounding drilling fluid produce variations in an electric generating system located opposite the zone of investigation in the drill pipe, and signals are transmitted to the surface through a non-conductive coupling and a continuous cable. Another object of this invention is to provide such a system including an expeditious means for permitting rapid changes in the length of the drill string.

Other objects and advantages of this invention will be apparent from the specification and from the attached figures which form a part of the specification and are to be read in conjunction therewith and in which the same reference numerals in two or more drawings refer to the same or a corresponding part.

Figure 1 shows in diagrammatic form a cross section of the earth penetrated by a drilling well and a portion of the drilling apparatus as well as apparatus useful in carrying out one embodiment of my invention;

Figure 2 is a circuit diagram of one form of electric generator which can advantageously be used to produce logging signals used in the invention;

Figure 8:
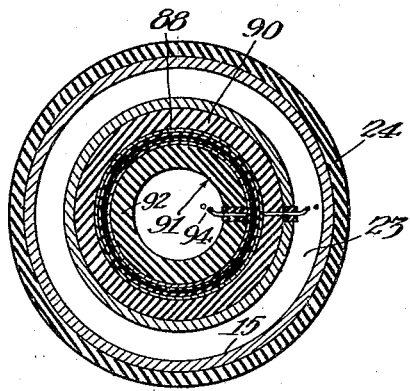
Figure 10:
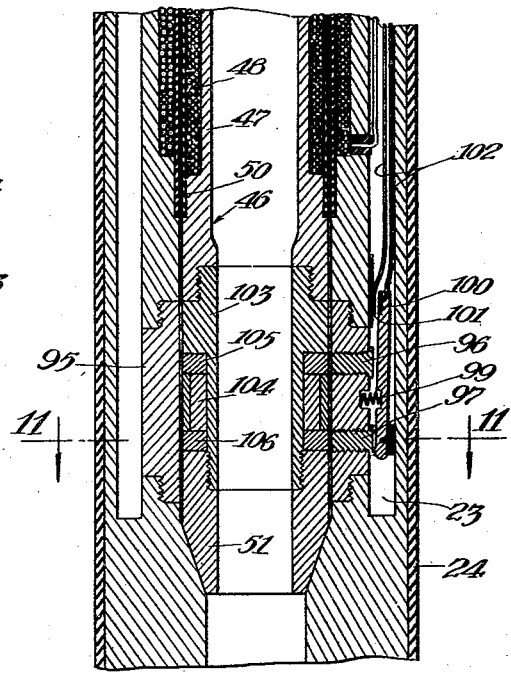
Figure 9:
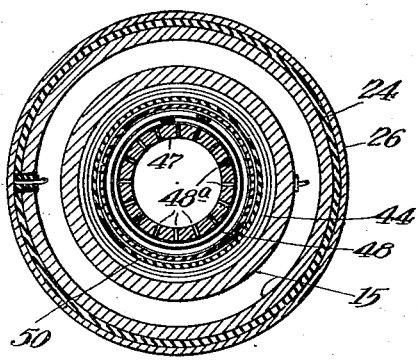
Figure 11:
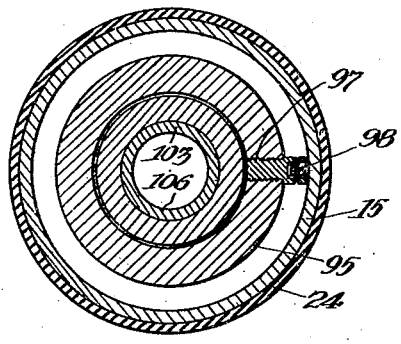
Figure 12:
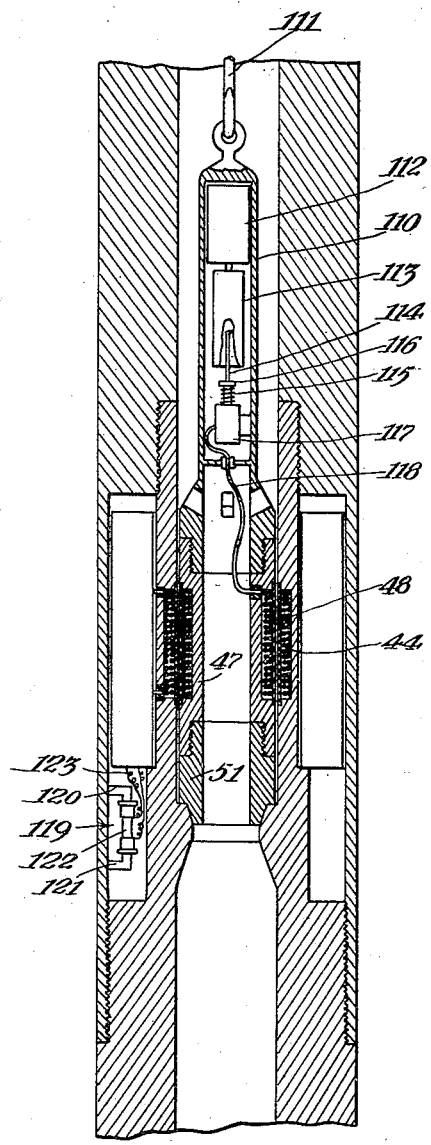
Figure 13:
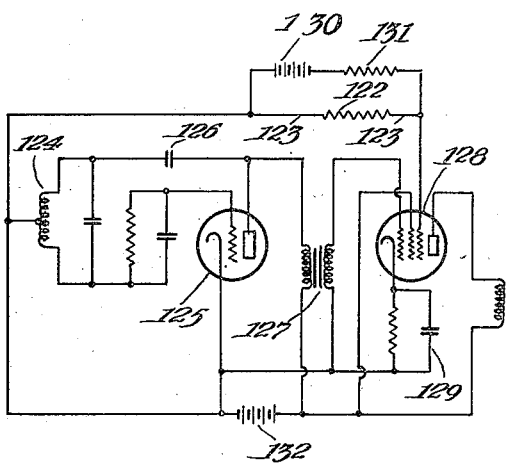

Figures 3, 4 and 5 are details of part of the apparatus of Figure 1 taken along the lines 3—3, 4—4 and 5—5, respectively;

Figure 6 is an enlarged cross section of one form of coupling device used to transmit signals from the generating apparatus to the surface of the ground;

Figure 7 is a similar cross section view of an alternative coupling device;

Figure 8 is a cross section along the line 8—8 of Figure 6;

Figure 9 is a cross section along the line 9—9 of Figure 7;

Figure 10 is a cross section of the lower portion of the drill string showing a coupling device similar to Figure 6 and also showing switching means useful in connection with the operation of the invention;

Figure 11 is a cross section along the line 11—11 of Figure 10;

Figure 12 is a cross section of a drill pipe showing another embodiment of my invention; and Figure 13 is a diagram of the electrical apparatus shown in Figure 12.

Briefly the method involved in this invention involves generating electric signals within the pipe (normally drill pipe) in the well, said signals being generated in such a fashion that one characteristic of the signals is indicative of the desired quantity to be measured, such as at least one property of the formation adjacent the generator, or of the drilling fluid in contact with the formation, electrically coupling the signals to a removable electric coupling element suspended on a cable in the drill pipe, transmitting the signals induced in the element to the surface of the earth, and producing an indication of the value of the characteristic of these signals. Means are provided so that the coupling element may be rapidly lowered through the drill string or rapidly removed during the time that the drill pipe is rotated and special means are provided to hold the coupling element above the drill kelly during the time that it is desired to make up another section of the string of drill pipe. A very important characteristic of the invention is that the coupling element is insulated against conductive contact with the generating apparatus in the well. This system possesses two outstanding advantages over anything now known in this particular art. In the first place, the motion of the drill pipe need be stopped only during the usual length of time required to change joints of drill pipe so that there need be no extra time involved because of the use of the logging cable and accessories. This is of extreme importance since the least possibility of blow-outs, damaged holes, sloughing formations, etc. occurs under these conditions. Second, since there is no conductive contact the short circuiting action of the drill mud on any device such as that described in the aforementioned United States Patent 2,247,417 is greatly minimized.

In Figure 1 is shown in diagrammatic form a cross section of drilling well 11 penetrating downward from the surface of the earth 12, in which is located a string of drill pipe indicated generally by numeral 13 which includes above the drill bit 14 several sections of enlarged diameter pipe known as a drill collar 15. At the upper end of the drill string it is attached to a kelly 16 which is gripped by the rotary table 17 and revolved thereby. This rotary table rests on a platform 18 and is revolved through shaft 19 by a drilling engine (not shown). The drill string is supported by means of a rotary swivel 20, the bail of which is held by the hook 21 of a travelling block supported by a derrick (not shown). The system described thus far is entirely conventional. As shown in Figure 1, the drilling has progressed to such a point that a string of surface casing 22 has been cemented in place. This is not necessary for the utilization of this invention, however. One section of the drill collar 15, preferably the lowermost section thereof, is a special section which has been cast or machined to produce a hollow annulus 23, the details of which are shown in Figures 6 and 7. Outside of this annulus 23 and for some distance above and below the drill collar is covered with a layer of insulation 24 which may be any of the plastics such as Bakelite which experiences only slight eroding under the abrasive action of the drilling fluid. In the embodiment shown, the resistance of the earth formations is to be determined. Accordingly, two metal ring electrodes 25 and 26 are mounted, preferably flush with the outer surface of the insulation 24. These electrodes are insulated from the drill collar itself.

The electric apparatus used for generating the signals is mounted within a container 27 in the hollow annulus 23. Insulated leads 28 connect the electrodes 25 and 26 to this apparatus. The apparatus in the container is designed to generate electric signals a characteristic of which is indicative of the property of the formations being logged. In the particular embodiment shown a variable frequency oscillator is mounted in the container producing signals the frequency of which varies with the impedance across the electrodes 25 and 26. This apparatus is shown in Figure 2. A battery 29 in series with an adjustable resistance 30 is connected by means of the leads 28 across the electrodes 25 and 26. The drop across resistance 30 is accordingly a function of the resistance between electrodes 25 and 26. If the radial distance between the electrode outer surface and the wall of the well is large, this resistance is governed by that of the drilling fluid adjacent the formations in this region; if the radial distance is small, the resistance is chiefly due to the resistivity of the formations forming the boundaries of the wells roughly in the zone defined by the electrodes. The drop across resistance 30 is applied by leads 31 across a coil 32 on a saturating reactor 33. The core of this reactor which is of ferromagnetic material will carry a magnetic flux which varies with the resistivity of the formations. Two other coils 34 and 35 are wound on the outer two legs of the saturating reactor 33 and are connected to form an oscillating tank circuit in connection with an adjustable condenser 36. The frequency of this tuned circuit will vary with the inductance of the coils. This inductance in turn will vary with the degree of saturation which is produced by the current flowing through a coil 32 so that the tuned frequency of the tank circuit decreases as the resistance between electrodes 25 and 26 increases and vice versa. The tank circuit is connected by leads 37 and 38 to the plate and grid ring of a vacuum tube 39. The filament of this tube is connected between the coil 35 and condenser 36 by lead 40 and is suitably biased by a conventional cathode biasing circuit 41. A suitable filament battery 42 and a plate battery 43 are connected in the circuit in a manner well known in the art. It is apparent that this apparatus will produce sustained electric signals the frequency of which will be directly related to the resistance of the formations. This frequency is therefore the parameter or characteristic of the signals which is employed in the logging operation. In one embodiment of this invention as shown in Figures 1 and 7, a coupling coil 44 is connected in the plate circuit of the vacuum tube 39 in order to transmit the signals to the surface of the earth. This coil is wound substantially coaxially with the drill collar and is insulated therefrom. It is mounted in a groove in the inner wall of the drill collar as shown in Figure 7. An alternative coupling means is shown in Figure 6 which will be described subsequently. An electric cable 45 passes down through the drilling string and is connected at the end to a coupling element 46.

This coupling element 46 contains a central core section 47 of ferromagnetic material, preferably slotted to reduce eddy currents, wound upon which is a coil 48 which is insulated therefrom except at one end of this coil. The other end of the coil is brought out to a lead 49 which forms the central insulated conductor in the cable 45. The outer surface of the coil 48 is protected by a thin covering of insulated material 50, as is the outer surface of the coil 44. At the lower end of the core 47 is a tail piece 51 and at the upper end is a nose piece 52, the upper end of which is vertically slotted (not shown), and machined with a conical screw thread 53. A perforated cap 54 screws over these threads as it is screwed down. Due to the conical screw thread 53 and the vertical slotting the upper end of the nose piece 52 is compressed outside of the cable 45 thus forming a clamp at the ends of the cable. Other types of cable clamps can, of course, be used, as this clamp design forms no part of my invention. The outer surface of the cable 45 is armored and insulated from the conductor 49 thus forming a second electrical conductor between the coupling element and the surface of the earth. The core 47 and the tail piece 51 are hollow and there are ports 55 in the nose piece 52 permitting flow of drilling fluid longitudinally through the coupling element. Below the position of the coil 44, the section of the drill collar in which the apparatus is mounted is machined to fit the outside of the tail piece 51 as shown in Figures 1, 6 and 7 so that as the coupling element is lowered on cable 45 it eventually is placed with the coil 48 adjacent the coil 44. The signals from the oscillator shown in Figure 2 are by this means coupled electromagnetically to the two conductors of the cable 45 by means of which they are transmitted to the surface of the earth. If a two-conductor cable is used one conductor is substituted for the armored sheath.

The upper end of the kelly 16 is attached by conventional drill pipe joint to a pipe 56. This pipe is connected through a special double reducer 57 to two short pipe sections 58 which are in turn connected to a second reducer 59 which in turn is connected by a screw thread to the drill swivel 20. In the center of the double reducer 57 is mounted stuffing box 60 which may be any of the well known types now on the market. The cable 45 passes through the stuffing box 60 and over the pulley 61 through a winding apparatus 62 and is spooled thereby onto a reel 63 rotatably mounted about pipe 56 by suitable bearings (not shown). The inner conductor 49 of the cable 45 is brought out as shown in Figure 3 through a hole in the top plate of reel 63 and attached to a brush 64 which bears against a slip ring 65 which is mounted upon and suitably insulated from a plate 66 carried by pipe 56. A conductor 67 connects the slip ring 65 with a slip ring 68 mounted upon and suitably insulated from a plate 69 which in turn is mounted on the reducer 59. The armor on the cable 45 makes contact with the surface of reel 63 and in turn is connected metallically through the supporting bearings to the drill pipe and thus to the frame of the supporting derrick so that this conductor is effectively grounded. A brush holder 70 is mounted on the rotary swivel 20 and carries three insulated brushes, each one of which bears against a corresponding slip ring on the plate 69. The brush bearing against slip ring 68 is connected through a conductor 71 to one side of the input of a recording frequency meter 72, the other side of which is grounded and is therefore connected to the armor of the cable 45. The output of galvanometer 73 which forms part of the recording frequency meter records on a chart 74 in a manner well known in the art.

It is to be noted that the source of electric waves, the cable and its appurtenances, in fact all of the apparatus associated with the drill string up to the plate 69 rotates with the drill string so that the frequency modulated signals generated in apparatus 27 can be recorded while the drill is revolving as has been pointed out above. This is highly important because it permits the freshly drilled section to be logged almost as soon as that portion of the well has been formed. Of course it is also possible to stop the rotation of the rotary table 17 and to lift the drill string by means of the travelling block 21 thereby logging a section upwardly from the lowest position to the highest position to which the drill string can be raised. The log on the chart 74 has a deflection which is proportional at any instant to the resistivity of the formations being logged. By conventional means (not shown) the recording chart is made to move in conjunction with the position of the logging electrodes.

Whenever it is desired to add or remove sections of drill pipe, it is merely necessary to reel up the cable 45 on the reel 63 until the coupling element 46 is located above the top of the section of the drill pipe where the new joint is to be made after which the customary procedure for adding or removing a joint can be carried through. In order to rotate the reel 63 a relatively small electric motor 75 is mounted above the reel and geared to the gear 76 attached to the reel 73. The top of this gear is bevelled to cooperate with the bevelled gear 77 which through a worm 78 and gear 79 rotates the shaft 80 of winding mechanism 62 as more clearly shown in Figure 5. A counter 81 is attached to the pulley 61 since the outside of this pulley is of fixed diameter, for example 1 foot. The number of revolutions is directly translated into the number of feet of cable in the well. By this means it is possible to ascertain the depth of the logging element at any time and also it is possible to ascertain after the cable has been largely removed from the well, as to when the coupling element 44 has been elevated to the proper position. The motor 75 is connected to the two inner slip rings 82 on plate 69 which are fed with electric current from a generator 83 through a control rheostat 84 and an off-on switch 85. A reversing switch 86 may suitably be mounted on the motor so that when it is desired to lower the cable into the well, the motor can be used to drive the reel until such time that sufficient cable is in the well to enable the weight of that cable to pull the coupling element downward.

Figure 2A:
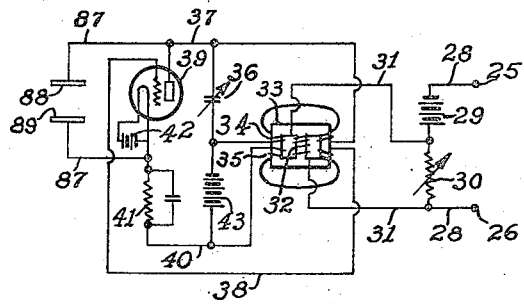
Figure 2A is a circuit diagram of an alternative form of electric generator which can advantageously be employed with a coupling device such as shown in Figure 6.

One design of an electromagnetic coupling element suitable for use in coupling the generator in a well to the cable 45 has already been described in Figures 1 and 7. A cross section of this apparatus along the line 9—9 is shown in Figure 9. In Figure 6 an alternative form of design of coupling element is shown. In this case the coupling is electrostatic. Two leads 87 from the generator which may suitably be of the type shown in Figure 2A, are brought out from the cathode and plate of the oscillator and are attached to two electrodes 88 and 89 which, as shown in Figures 6 and 8, are mounted coaxially with the drill stem and insulated by suitable insulation 90, against contact with either the drill stem or the fluid inside this drill stem. When this particular type of apparatus is employed coil 44, as shown in Figure 2, is eliminated. The difference of potential across the cathode and plate of vacuum tube 39 in the generator charges the electrodes alternately, positively and negatively, producing an electric field between the electrodes 88 and 89. The electric coupling element 46 in this case has a central body 91 of insulating material, for example one of the phenol plastics which is connected to the nose piece 52. Within this plastic and preferably moulded therein are two electrodes 92 and 93 corresponding to the charging electrodes 88 and 89. One of these electrodes 92 is connected directly to the metallic sheath on cable 45 while the other is connected to the insulated wire 94 in cable 45. Operation of this device is apparent from what has already been said. The electric field produced by the voltage applied between electrodes 88 and 89 induces charges on the two electrodes 92 and 93 which are positioned adjacent the field and connected to the conductors of cable 45. These charges are in effect electric signals which are transmitted to the surface of the earth where, as shown in Figure 1, an indication is produced proportional to the frequency of these signals. As in the previous embodiments of the invention, the drill pipe may be moved either by drilling to a greater depth or by pulling up to move the zone of investigation roughly defined as the space between electrodes 25 and 26 relative to the boundaries of the well.

In the embodiments of the invention thus far discussed, no provision has been made to turn off the generator in the well during such time as the apparatus is not in use. Since it is necessary in general to operate the well generator from dry batteries, it is advantageous in case the apparatus is to be removed from the well for a period of time to shut off the filament supply to the tube 39. One apparatus suitable for accomplishing this is shown in Figures 10 and 11. In this case the hollow annulus 23 in the section of the drill collar 15 is made longer and a non-magnetic insert 95 is incorporated in the inner wall of the drill pipe as shown in Figure 10. Two ferromagnetic members 96 and 97 are provided in this insert, one above the other with one end of each forming a portion of the inner wall of the drill pipe. The other end of the lower ferromagnetic member 97 is drilled and slotted to form a pivot for an armature 98 of a relay with a filament relay switch. This armature is urged into an open position by the action of a coil spring or the like 99. At the non-pivoted end it bears a contact 100 which cooperates with a second contact 101. Two insulated wires 102 are connected in series with one side of the filament of the vacuum tube 39 and to the contacts 100 and 101 respectively. Thus when these contacts come together the filament of the vacuum tube 39 is energized.

The lower part of the electric coupling element 46 likewise contains a non-magnetic insert 103 within which is positioned a cylindrical permanent magnet 104 which is preferably made of Alnico or the like and which is held between two ferromagnetic rings 105 and 106. As long as the electric coupling element is not seated on its tapered seat in the drill collar, the armature 98 of the filament relay switch is open. However, as soon as the coupling element 46 is seated, there is a magnetic circuit including the magnet 104, rings 105 and 106, elements 96 and 97 and armature 98 through which flux flows attracting the armature and closing the two contacts 100 and 101. As long as the electric coupling element 46 is seated in the well, therefore, the generator shown in Figure 2 is energized but as soon as the coupling element is removed from the well armature 98 is urged into the open position and stops useless discharge of the filament and plate batteries.

Another embodiment of my invention is shown Figures 12 and 13. In this particular embodiment the recording apparatus is arranged adjacent the coupling element rather than at the surface of the ground as shown in Figure 1. A case 110 suspended from a wire line or cable 111 is lowered into the drill pipe. This case contains in the upper end a clock mechanism 112 which serves to rotate a hollow cylindrical drum 113 which carries inside it the recording chart. A recording stylus 114 is arranged to move vertically to record the condition being observed in the well. This stylus is urged upwardly by a spring 115 bearing against a shoulder 116 of the soft iron armature, the lower end of which is positioned within a solenoid 117. Accordingly, depending upon the amount of current applied to the turns of the solenoid the recording stylus will move up or down. The current energizing the solenoid 117 is conducted thereto through a two conductor cable 118, the ends of which are attached to the two ends of the coil 48 in the coupling element 46. The current is induced in coil 48 by induction from the energizing coil 44 mounted in the drill pipe. This coil is energized from the apparatus enclosed in the can 27, which apparatus is shown in detail in Figure 13.

The quantity being recorded in the particular apparatus shown in Figures 12 and 13 is the pressure on the drill pipe adjacent the drill bit and is in essence a measurement of the force applied to the drill bit. This measurement is accomplished by attaching a simple extensometer to the wall of the drill pipe. The extensometer 119 includes two end pieces 120 and 121 relatively rigidly mounted on the drill pipe, carrying between them a variable resistance 122 which may, for example, be a carbon pile, the resistance of which varies with the pressure impressed upon it. Across the ends of this carbon pile are leads 123 which lead into the apparatus contained in container 27.

As has been previously mentioned, the invention can be practiced using either amplitude modulated waves or frequency modulated waves. In Figure 13 the apparatus is shown adapted to the use of amplitude modulated waves of relatively constant frequency. There is an oscillator circuit including a tank circuit 124 and a triode vacuum tube 125 equipped with a suitable filament (not shown). The plate of the triode 125 is coupled to one side of the tank circuit through a condenser 126 in the conventional manner. The output of this amplifier which is at relatively constant frequency and amplitude is coupled through transformer 127 to a pentode 128. The cathode of this tube is supplied with a conventional cathode biasing circuit 129 including a resistance and shunt condenser. The plate of this pentode is connected to the coil 44, the other side of which is connected to the plate battery 132. A second battery 130 is connected in series with a fixed resistance 131 to the carbon pile extensometer resistance 122. The drop across the extensometer is applied between the cathode and the suppressor grid of the pentode 128, thus modulating the amplitude of the pentode output. The amplitude of the signal applied to the coil 44 is at approximately constant frequency with an output amplitude which varies with the pressure on the extensometer, i. e., as a function of the pressure on the bit. The amplitude modulated signal is inductively coupled to the coil 48 thereby determining the amount of current which flows in the two conductors of cable 118 which in turn adjusts the vertical position of stylus 114 writing on the chart within the drum 113.

Vibration of the bit causes pressure fluctuations on the extensometer 119, which are recorded on the chart.

If instead of using a carbon pile for element 119 a pressure-insensitive temperature-sensitive resistance is used at this point all other elements being maintained as shown in Figures 12 and 13, the characteristic of the signal that is recorded will be the temperature adjacent this temperature-sensitive resistance wire.

It is to be noted that in this embodiment of the invention the recording takes place regardless of the rotation or lack of rotation in the drill pipe so that this essential feature of the invention is preserved. At any time when it is desired to change the length of the drill pipe the cable 111 is pulled up until the coupling element 46 is above the kelly and then another joint is added or removed as the case may be. This last embodiment has as a separate advantage the fact that there need be no insulated electric cable used in suspending the instrument in the well so that there is no difficulty with cable leakage, etc. On the other hand, there is a disadvantage in this particular arrangement in that until such time as the record is removed from the well it is impossible to view the log of the characteristic being measured.

The invention described may be used, as is apparent from the description above, to locate not only the interfaces between formations but also may be used to determine other drilling information important to the well records, such as bit pressure, vibration of the bit (both amplitude and/or frequency) or any other physical characteristic which is associated with the region adjacent the drill bit.

It is apparent from the description of the method and apparatus disclosed that many modifications in the transmitting system described can be accomplished without departing from the spirit of this invention. There is no intent on the part of the inventor to be limited to the various embodiments which have been shown herein since, as is already mentioned, these are merely for purposes of illustration. The invention is best set out in the appended claims.

I claim:

1. A method of logging wells containing a string of rotatable drill pipe including the steps of producing in an insulated section adjacent the inner wall of said pipe electric signals a charactertistic of which is indicative of at least one physical property of the region adjacent the bottom of said well, lowering a removable electric coupling element within said pipe to a point adjacent said insulated section whereby said signals are electrically coupled to said coupling element, transmitting the signals thus coupled to an indicator, and there producing an indication in response to the value of said characteristic of said transmitted signals.

2. A method of logging wells containing a string of drill pipe during the drilling of said well, including the steps of producing electric signals a characteristic of which is indicative of at least one property of the formations forming the boundaries of said well in an insulated section adjacent the inner wall of said pipe, positioning a removable electric coupling element forming part of an electric circuit within said pipe at a point adjacent said insulated section, whereby said signals are electromagnetically coupled to said coupling element, transmitting the signals thus coupled through said circuit to the surface of the earth, and there producing an indication in response to the value of said characteristic of said transmitted signals, and moving said drill pipe vertically while maintaining said coupling element adjacent said insulated section to a plurality of positions of said pipe relative to said well.

3. A method of logging wells containing a string of drill pipe during the drilling operation including the steps of producing within said well an electric current the frequency of which is varied in response to a characteristic of the formations adjacent a restricted zone of investigation in said well, causing said current to flow through a coil within said drill pipe and substantially coaxial therewith, positioning adjacent said coil but electrically insulated therefrom a second electric coil connected to a cable, transmitting electric signals induced in said second coil to the surface of the earth, producing an indication proportional to the frequency of said induced signals, and repeating the above-mentioned steps at a plurality of said zones in said well.

4. A method of logging wells containing a string of drill pipe including the steps of producing within said well an electric field the frequency of which is varied in response to a characteristic of the formations adjacent a restricted zone of investigation in said well, causing said field to induce charges on at least one electrode positioned adjacent said field and connected to an electric cable suspended from the surface, transmitting to the surface of the earth electric signals responsive to said induced charges, producing an indication proportional to the frequency of said signals, and repeating the above-mentioned steps while said drill pipe is moved to move said zone of investigation relative to the boundaries of said well.

5. Apparatus for determining the value of a quantity in a well near the bottom thereof, said well containing a string of pipe, including means mounted in a section of said pipe for generating electric signals, electric coupling means mounted inside but insulated from said drill pipe, means connected to said generating means and said coupling means for varying a characteristic of said signals in proportion to said quantity, an electric cable, an electric coupling element connected to said cable but insulated from conductive connection to fluid in said well, means located at the surface of the earth to position said coupling element adjacent said coupling means, and means responsive to electric signals in said cable for producing an indication of said characteristic of said signals in said cable.

6. Apparatus for logging a section of a well containing a string of rotatable drill pipe including means for generating electric signals mounted within a section of said pipe near the lower end thereof, a plurality of vertically spaced electrodes mounted on the outside of said section but insulated therefrom, electric coupling means mounted inside but insulated from said drill pipe and connected to said generator, an electric circuit connected to said generator and said electrodes, whereby the frequency of said signals varies in response to the resistance between at least two of said electrodes, an electric cable, an electrical coupling element connected to and suspended from said cable but insulated from conductive connection to fluid in said well, means at the surface of the earth to position said coupling element adjacent but insulated from said coupling means, means responsive to the frequency of electric signals induced in said coupling element for producing an indication of the frequency of said induced signals, and means for changing the vertical position of said drill pipe.

7. Apparatus according to claim 6 in which said coupling means and said coupling element each comprise a coil substantially coaxial with said drill pipe.

8. Apparatus according to claim 6 in which said coupling means and said coupling element each comprise two vertically spaced metal electrodes, said spacing for said means and for said element being substantially equal.

9. Apparatus according to claim 6 including means mounted on the support for the upper end of the drill string above the kelly bushing thereof for elevating said coupling element above said bushing whereby drilling operations including changes in the length of said drill string may be accomplished without disassembling said support, said means including a stuffing box by means of which said cable passes through the wall of said drill pipe.

10. Apparatus according to claim 6 including means mounted adjacent the generating means for energizing said generating means, and magnetic means mounted on said electric coupling element for actuating said energizing means when said coupling element is positioned adjacent said coupling means.

DANIEL SILVERMAN.